United States Patent
Kaneko et al.

(10) Patent No.: US 10,179,558 B2
(45) Date of Patent: Jan. 15, 2019

(54) AUTOMOTIVE BUMPER REINFORCEMENT

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP)

(72) Inventors: Takanobu Kaneko, Nantong (CN); Kiyoichi Kita, Okazaki (JP); Jun Shobo, Anjo (JP); Kyosuke Matsui, Anjo (JP); Yuta Takanami, Imizu (JP); Hirofumi Shibata, Kariya (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 15/705,525

(22) Filed: Sep. 15, 2017

(65) Prior Publication Data
US 2018/0079380 A1    Mar. 22, 2018

(30) Foreign Application Priority Data
Sep. 16, 2016 (JP) ................. 2016-181408

(51) Int. Cl.
*B60R 19/18* (2006.01)
*B60R 19/22* (2006.01)

(52) U.S. Cl.
CPC ............. *B60R 19/18* (2013.01); *B60R 19/22* (2013.01); *B60R 2019/1806* (2013.01)

(58) Field of Classification Search
CPC ...................................................... B60R 19/18

USPC ................................................... 296/102, 120
See application file for complete search history.

(56) References Cited

U.S. PATENT DOCUMENTS

| | | | |
|---|---|---|---|
| 2003/0227182 A1* | 12/2003 | Yoshida | B60R 19/18 293/102 |
| 2012/0025545 A1* | 2/2012 | Haneda | B60R 19/18 293/102 |
| 2013/0113224 A1* | 5/2013 | Tsuchida | B60R 19/18 293/102 |
| 2013/0241219 A1* | 9/2013 | Kaneko | B60R 19/34 293/133 |
| 2016/0280167 A1* | 9/2016 | Kaneko | B60R 19/34 |
| 2017/0166148 A1* | 6/2017 | Freundl | B60R 19/18 |
| 2018/0015895 A1* | 1/2018 | Kaneko | B60R 19/023 |

FOREIGN PATENT DOCUMENTS

| | | | |
|---|---|---|---|
| JP | 11-59296 | 3/1999 | |
| JP | 11-170935 | 6/1999 | |
| JP | 2003-182481 | 7/2003 | |
| WO | WO-2010/053709 A1 * | 5/2010 | ............. B60R 19/18 |

* cited by examiner

*Primary Examiner* — Jason S Morrow
(74) *Attorney, Agent, or Firm* — Finnegan, Henderson, Farabow, Garrett & Dunner, LLP

(57) ABSTRACT

The bumper reinforcement has a front surface flange, an upper surface web, a lower surface web, an upper lip, and a lower lip. An end of the upper surface web on the upper lip side is thicker than a center. When a collision load is applied to the front surface flange, the upper surface web extending in a direction orthogonal to the front surface flange from vicinity of an upper end of the front surface flange is deformed in an outward opened direction, and the upper lip extending downward from an extension end of the upper surface web is deformed in an inward closed direction.

5 Claims, 9 Drawing Sheets

FIG. 6A EMBODIMENT
LOAD DIRECTION
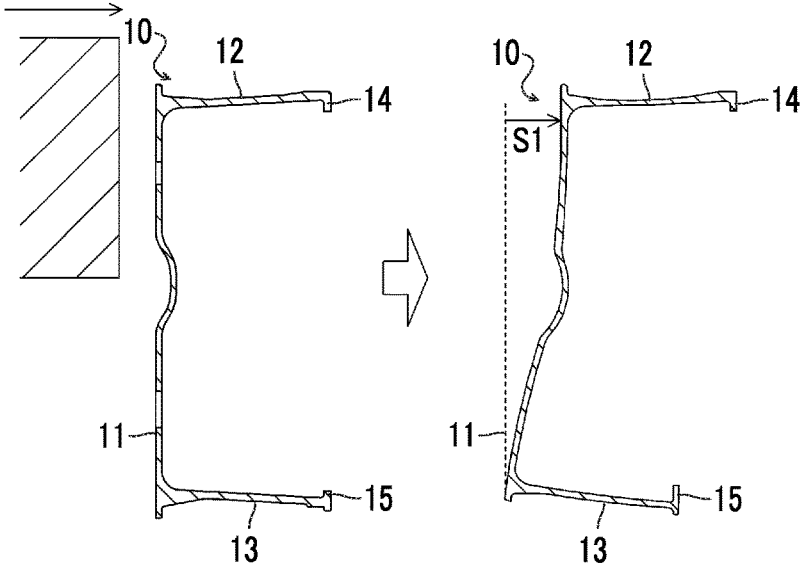
FIG. 6B FIRST COMPARATIVE EXAMPLE
LOAD DIRECTION
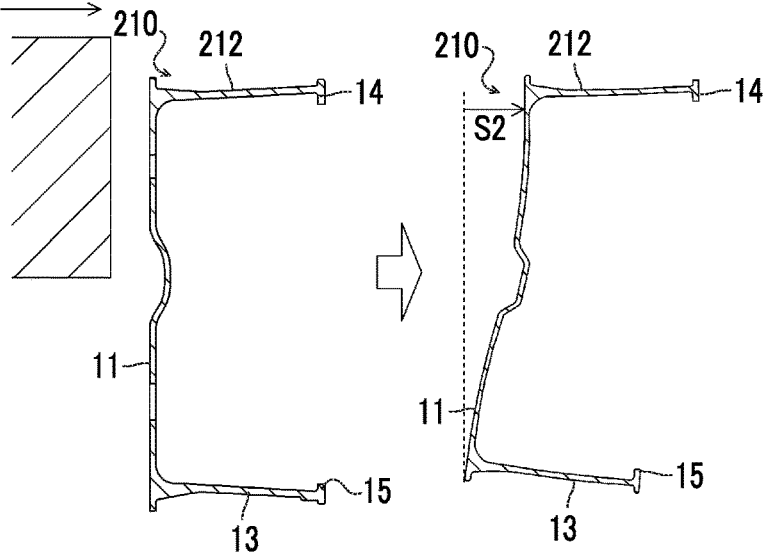

FIG. 8A  EMBODIMENT
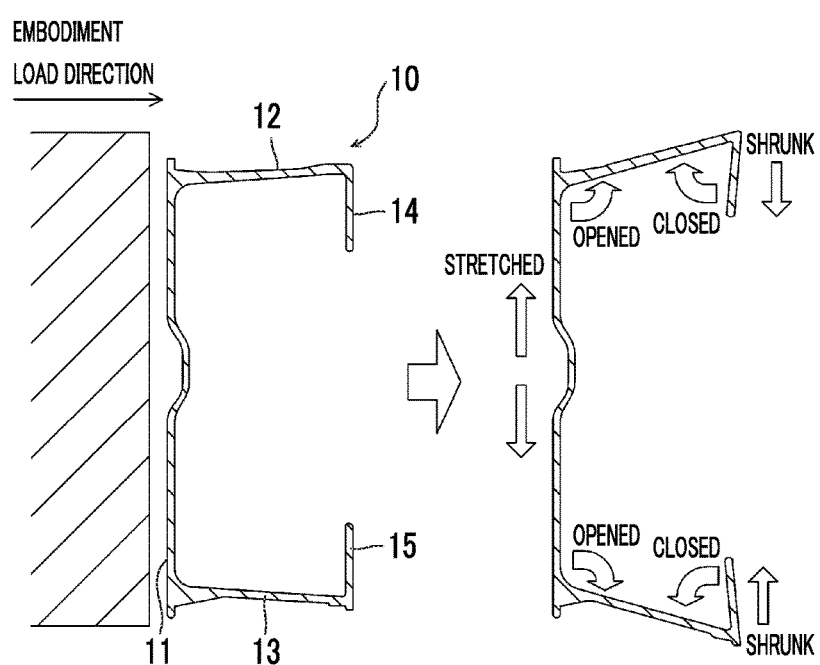
FIG. 8B  SECOND COMPARATIVE EXAMPLE
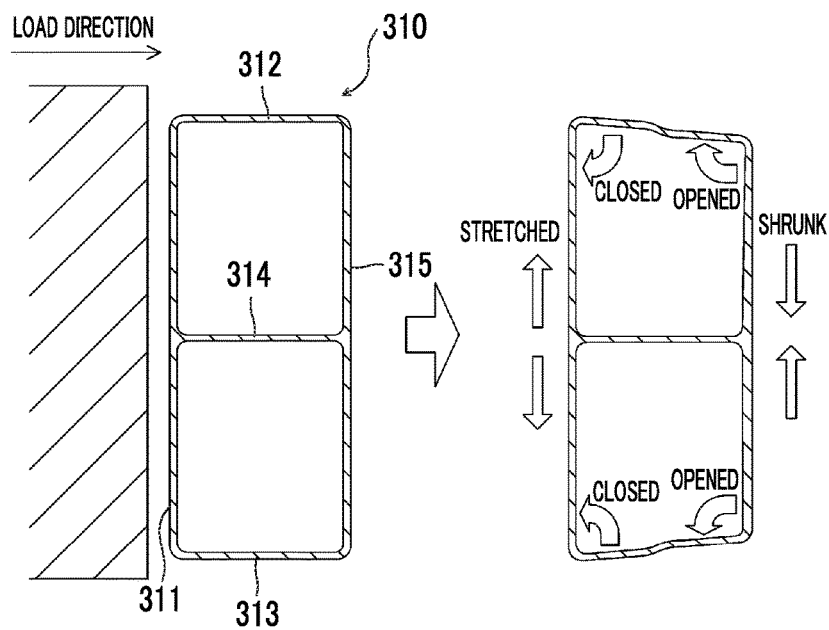

AUTOMOTIVE BUMPER REINFORCEMENT

INCORPORATION BY REFERENCE

The disclosure of Japanese Patent Application No. 2016-181408 filed on Sep. 16, 2016 including the specification, drawings and abstract is incorporated herein by reference in its entirety.

BACKGROUND

1. Technical Field

The disclosure relates to an automotive bumper reinforcement with a hollow structure that extends in a vehicle width direction.

2. Description of Related Art

Conventionally, a bumper reinforcement with a hollow structure that includes a closed cross section has been known. For example, in Japanese Patent Application Publication No. 2003-182481 (JP 2003-182481 A), a bumper reinforcement that includes rectangular closed cross sections and in which coupled portions of a front surface flange, an upper surface web, an intermediate web, and a lower surface web are thicker than portions thereof other than the coupled portions is disclosed. In addition, in Japanese Patent Application Publication No. 11-170935 (JP 11-170935 A), a bumper reinforcement that includes a rectangular closed cross section and in which four corners are thickened is disclosed.

SUMMARY

By the way, the bumper reinforcement that includes an opened cross section (a lip groove shape), and a back side of which is opened, is available. In this case, because a side member (a crush box) can be inserted in the bumper reinforcement, the side member (the crush box) can be extended, for example, and an energy absorption amount thereof can be increased. However, the bumper reinforcement that includes the opened cross section differs from the bumper reinforcement that includes the closed cross section in terms of a deformation mode at a time of receiving a collision load. Thus, this fact has to be sufficiently taken into consideration for formation of a thickened section.

The disclosure provides an automotive bumper reinforcement that includes an opened cross section and reduces a stroke amount during a collision by providing a thickened section at an appropriate position.

An automotive bumper reinforcement of an aspect of the disclosure is an automotive bumper reinforcement with a hollow structure that extends in a vehicle width direction, and has: a front surface flange; an upper surface web that extends in a direction orthogonal to the front surface flange from an upper end of the front surface flange; a lower surface web that extends in the direction orthogonal to the front surface flange from a lower end of the front surface flange; an upper lip that extends downward from an extension end of the upper surface web; and a lower lip that extends upward from an extension end of the lower surface web. An opening is provided between the upper lip and the lower lip is opened. An end of at least one of the upper surface web and the lower surface web on a lip side where the upper lip or the lower lip is provided has a thickened section that is thicker than a center thereof.

The automotive bumper reinforcement of this aspect has the front surface flange, the upper surface web, the lower surface web, the upper lip, and the lower lip. The opening is provided between both of the lips. The end of at least one of the upper surface web and the lower surface web on the lip side where the upper lip or the lower lip is provided has the thickened section that is thicker than the center thereof. In the automotive bumper reinforcement that is provided with such an upper lip and such a lower lip as described above, when a collision load is applied to the front surface flange, the upper surface web and the lower surface web are deformed in outward opened directions with respect to the front surface flange, and the upper lip and the lower lip are respectively deformed in inward closed directions with respect to the upper surface web and the lower surface web. Accordingly, deformation of the lips can be suppressed by thickening the end of the upper surface web or the lower surface web on the lip side. As a result, in the automotive bumper reinforcement that has an opened cross section, a stroke amount during a collision can further be reduced. Note that an end of at least one of the upper surface web and the lower surface web on the front surface flange side may also be thicker than the center.

In the automotive bumper reinforcement of such an aspect, the thickened section may be formed in a manner to be swelled outward. In this way, the deformation of the lips in the bumper reinforcement that has the opened cross section can further effectively be suppressed. In this case, a top of swelling of the thickened section may have a flat surface.

Alternatively, in the automotive bumper reinforcement of this aspect, a thickness of the thickened section may be gradually increased from the center to the end. In this way, stress concentration during the collision can further effectively be avoided.

In addition, in the automotive bumper reinforcement of this aspect, a side member or a coupled member that is fixed to the side member may be coupled to the bumper reinforcement in a state of being inserted therein. In this way, a curvature at a time when the bumper reinforcement is curved in an arc shape can be increased to improve design of a portion around a bumper without extending the side member or the coupled member in a vehicle longitudinal direction to further improve an energy absorption amount thereof or without increasing total length of the side member or the coupled member, for example.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6A is a view that illustrates a situation of deformation of the bumper reinforcement of the embodiment in the case where an upper side of a front surface flange 11 receives a collision load in a pendulum collision test;

FIG. 6B is a view that illustrates a situation of deformation of a bumper reinforcement of a first comparative example in the case where an upper side of the front surface flange 11 receives the collision load in the pendulum collision test;

FIG. 8A is a view that illustrates the situation of the deformation of the bumper reinforcement of the embodiment in the pendulum collision test;

FIG. 8B is a view that illustrates a situation of deformation of a bumper reinforcement of a second comparative example in the pendulum collision test.

DETAILED DESCRIPTION OF EMBODIMENT

The mode for carrying out the disclosure will be described by using an embodiment.

Figure 1:
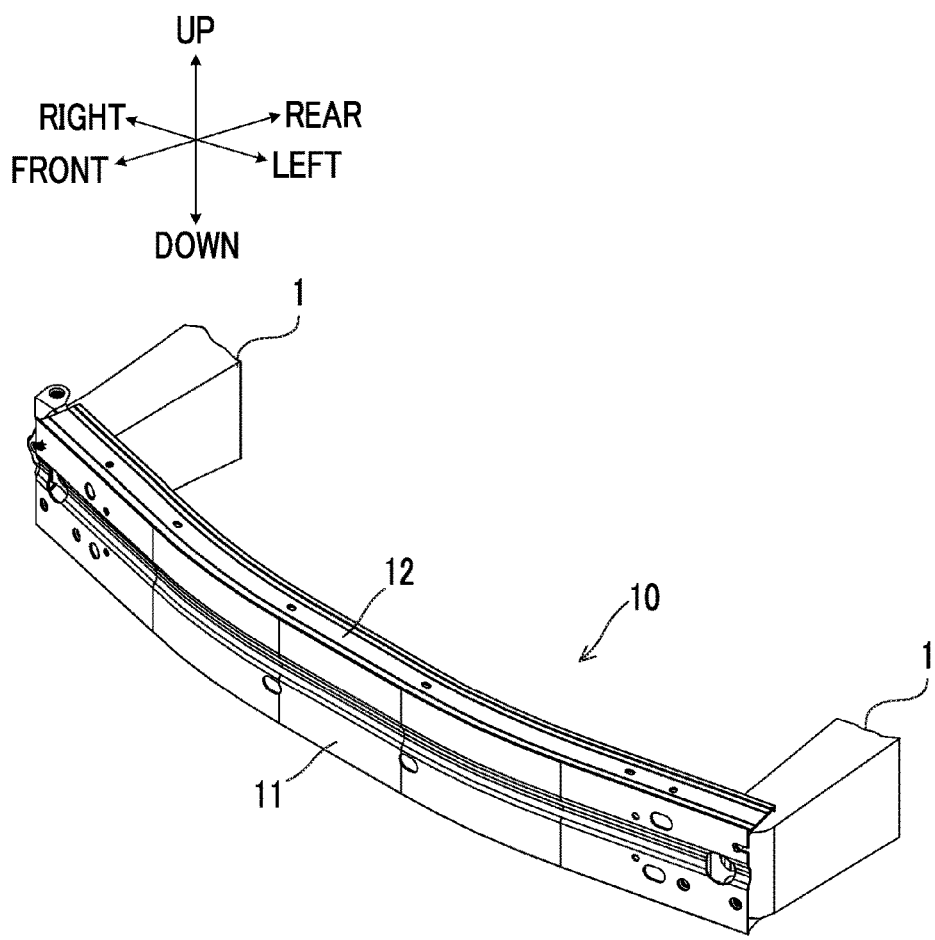
FIG. 1 is a perspective view of external appearance in which a bumper reinforcement 10 as one embodiment of the disclosure is seen from a front side.
Figure 2:
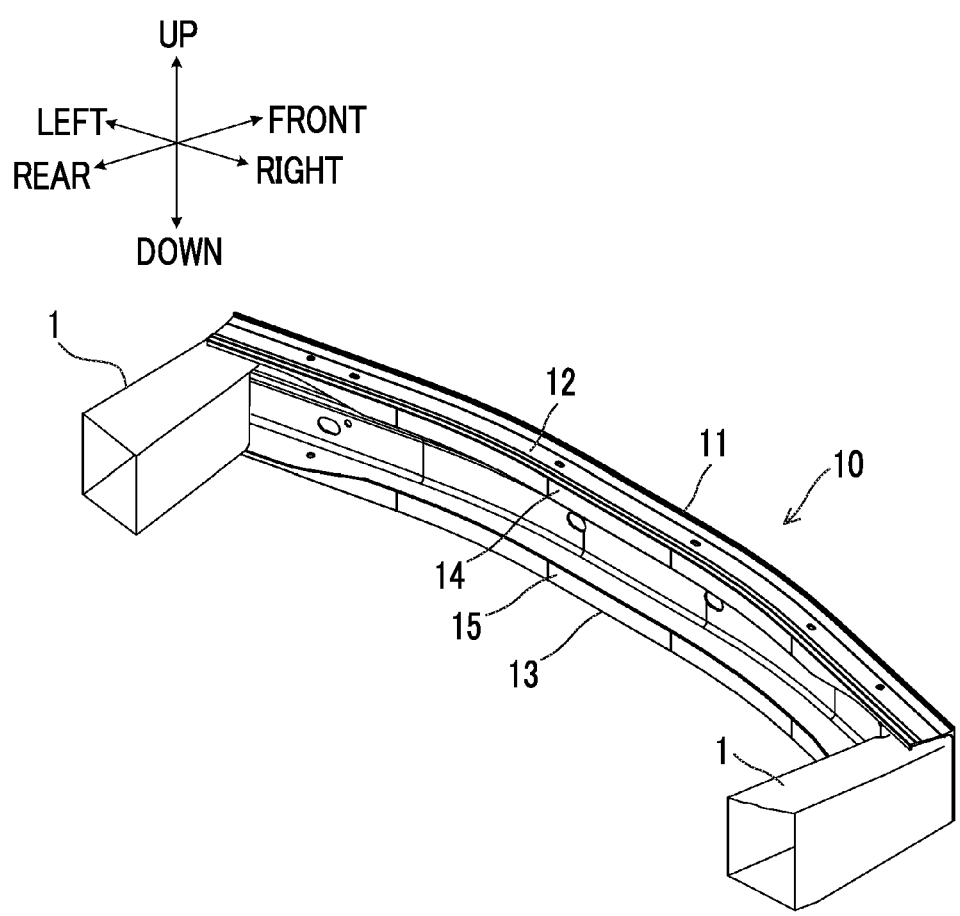
FIG. 2 is a perspective view of the external appearance in which the bumper reinforcement 10 of the embodiment is seen from a back side.
Figure 3:
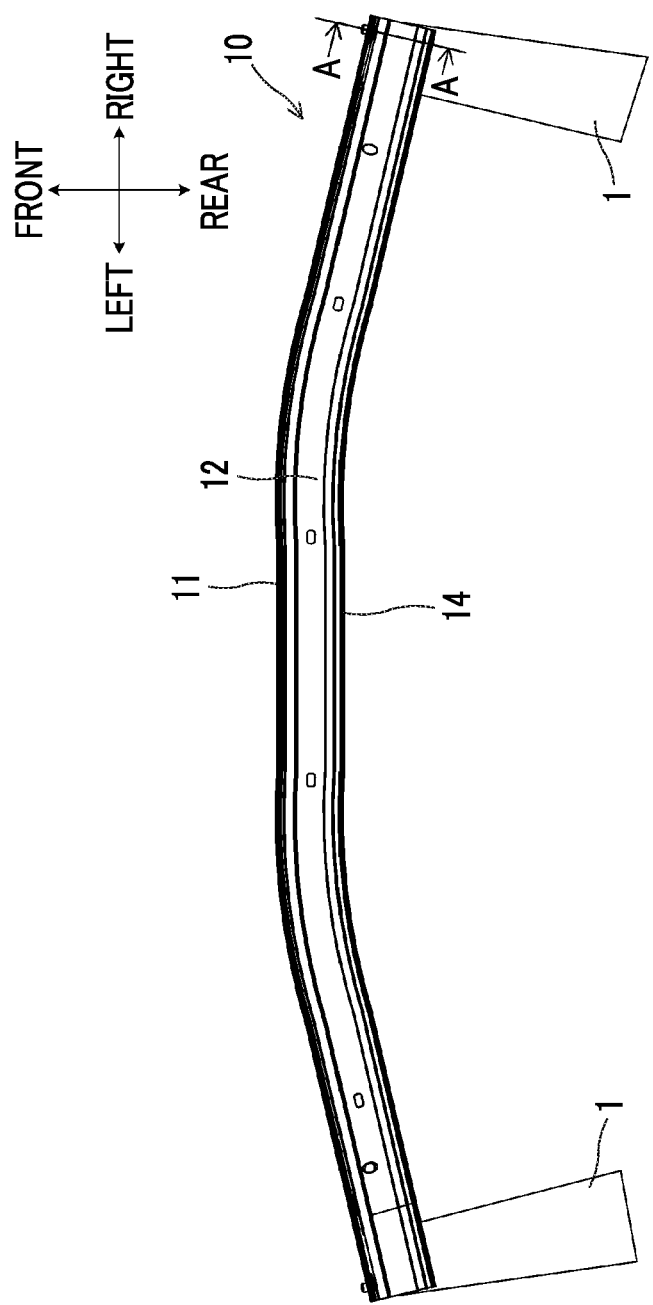
FIG. 3 is a top view of the bumper reinforcement 10 of the embodiment.
Figure 4:
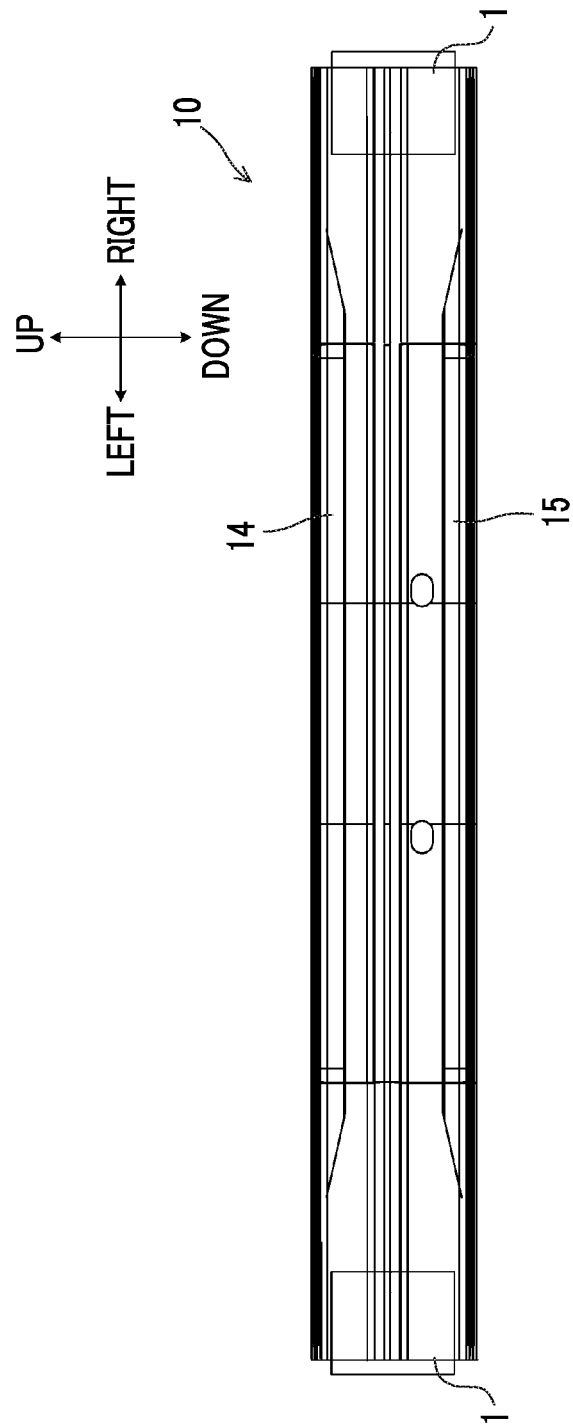
FIG. 4 is a rear view of the bumper reinforcement 10 of the embodiment.
Figure 5:
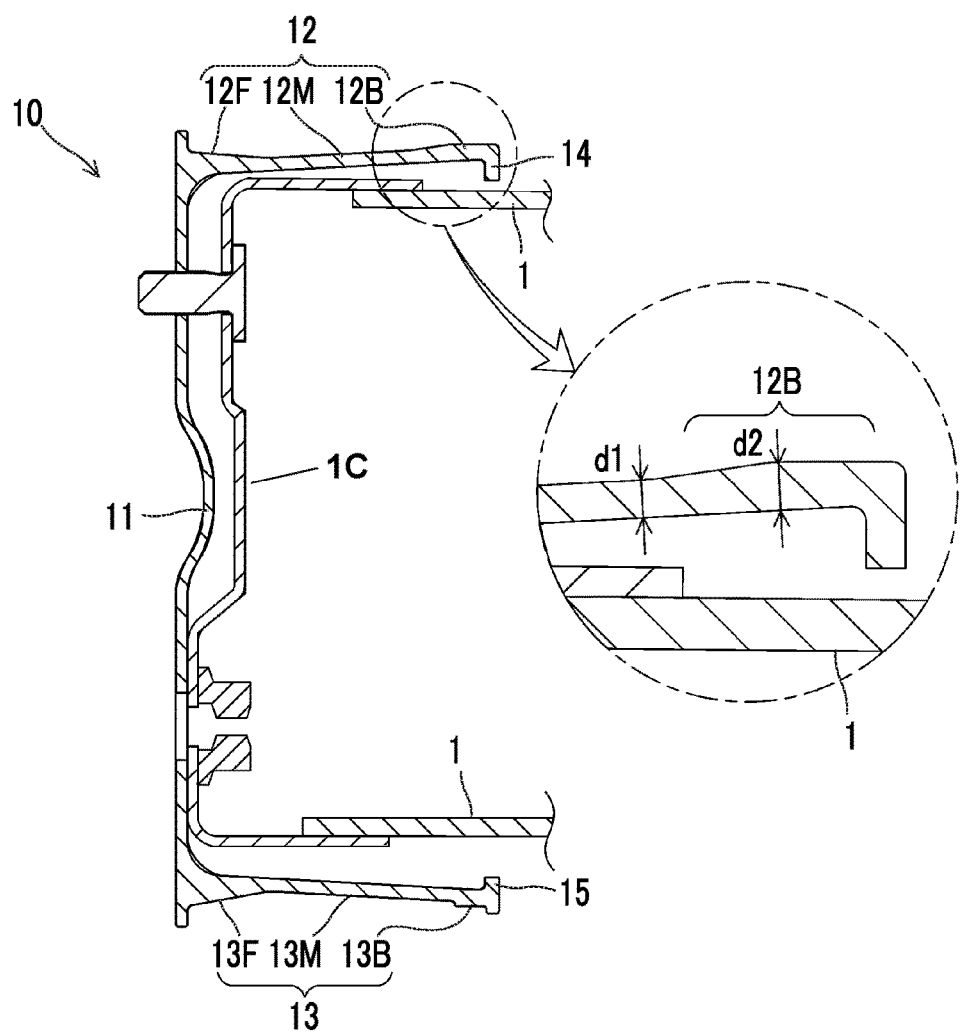
FIG. 5 is a cross-sectional view of a cross section A-A of the bumper reinforcement 10 in FIG. 3.

FIG. 1 is a perspective view of external appearance in which a bumper reinforcement 10 as one embodiment of the disclosure is seen from a front side. FIG. 2 is a perspective view of the external appearance in which the bumper reinforcement 10 of the embodiment is seen from a back side. FIG. 3 is a top view of the bumper reinforcement 10 of the embodiment. FIG. 4 is a rear view of the bumper reinforcement 10 of the embodiment. FIG. 5 is a cross-sectional view of a cross section A-A of the bumper reinforcement 10 in FIG. 3.

The bumper reinforcement 10 of the embodiment is elongated in a vehicle width direction, and both ends thereof are respectively fastened to right and left paired side members 1 that are apart from each other in the vehicle width direction. The bumper reinforcement 10 protects auxiliary machines (a radiator and the like) that are mounted on a back side of said bumper reinforcement 10 against a minor collision at a low speed.

As shown in FIGS. 1 to 5, the bumper reinforcement 10 of the embodiment is a long member in a lip groove shape (with a C-shaped cross section) that has: a front surface flange 11; an upper surface web 12 that extends in a direction orthogonal to the front surface flange 11 from vicinity of an upper end of the front surface flange 11; a lower surface web 13 that extends in parallel with the upper surface web 12 from vicinity of a lower end of the front surface flange 11; an upper lip 14 that extends downward from an extension end of the upper surface web 12; and a lower lip 15 that extends upward from an extension end of the lower surface web 13. For example, the bumper reinforcement 10 is constituted by bending an extruded material, which is molded by extruding aluminum or an alloy thereof using an extruder, in an elliptical arc shape.

As shown in FIG. 5, a coupling member 1C coupled to tips of the side members 1 is inserted in the bumper reinforcement 10 of the embodiment, and said bumper reinforcement 10 is fastened to the side members 1 by bolts and nuts, or the like in a state where an inner wall surface of the front surface flange 11 abuts tip surfaces of the side members 1. In this way, a curvature of the elliptical arc of the bumper reinforcement 10 can be increased to improve design of a portion around a bumper without extending the side members 1 to improve energy absorption amounts thereof or without reducing total length of the side members 1.

As shown in FIG. 5, in the upper surface web 12, plate thickness of an end 12F on the front surface flange 11 side and plate thickness $d2$ of an end 12B on the upper lip 14 side are greater than plate thickness $d1$ of a center 12M, that is, are thickened. In this embodiment, the end 12F of the upper surface web 12 on the front surface flange 11 side is thickened in a tapered shape such that both surface sides of an inner surface side and an outer surface side are gradually swelled from the center 12M to the front surface flange 11 side. Meanwhile, the end 12B of the upper surface web 12 on the upper lip 14 side is thickened such that an outer surface side is swelled from the center 12M to the upper lip 14 side while an inner surface side is not swelled. In this embodiment, this configuration is adopted to prevent interference between an inner surface of the end 12B of the upper surface web 12 on the upper lip 14 side and an outer surface of the side member 1 at a time when the tip of the side member 1 is inserted in the bumper reinforcement 10.

As shown in FIG. 5, in the lower surface web 13, an end 13F on the front surface flange 11 side is thicker than a center 13M. In this embodiment, the end 13F of the lower surface web 13 on the front surface flange 11 side is thickened in a tapered shape such that both surface sides of an inner surface side and an outer surface side are gradually swelled from the center 13M to the front surface flange 11 side. An end 13B of the lower surface web 13 on the lower lip 15 side is thinner than the end 12B of the upper surface web 12 on the upper lip 14 side.

Figure 7A:
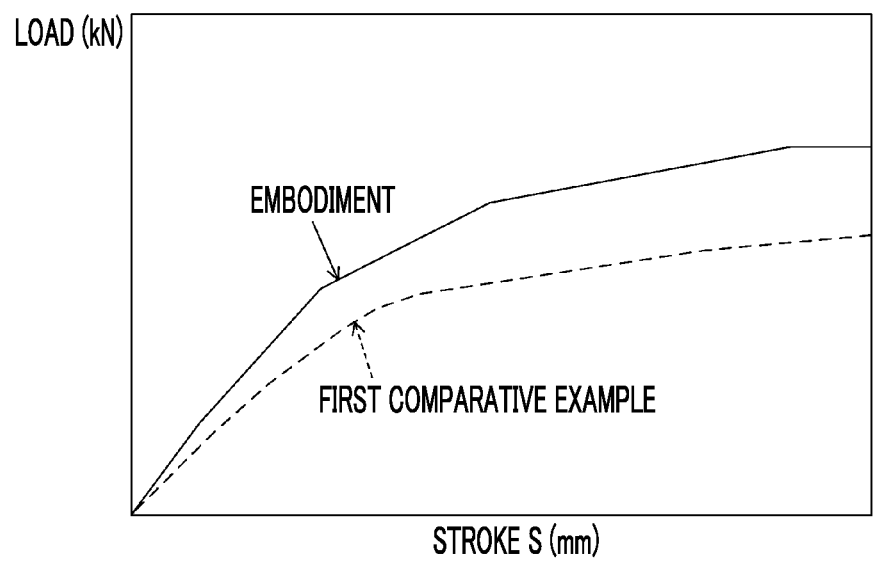
FIG. 7A is a graph that illustrates load-stroke curves of the bumper reinforcements of the embodiment and the first comparative example.
Figure 7B:
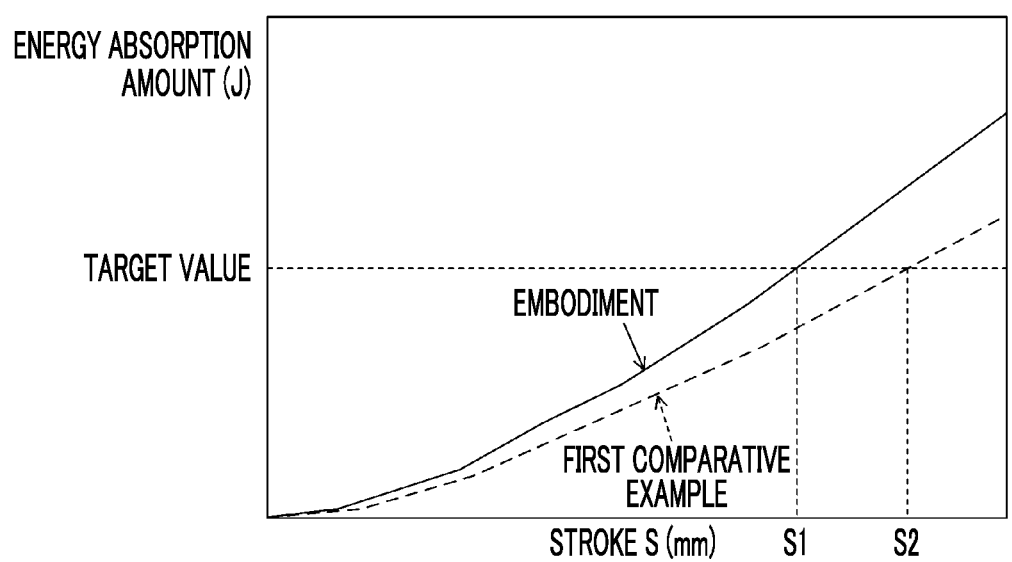
FIG. 7B is a graph that illustrates energy absorption amount-stroke curves of the bumper reinforcements of the embodiment and the first comparative example.

FIGS. 6A, 6B are views that illustrate situations of deformation of the bumper reinforcements of the embodiment and a first comparative example in the case where an upper side of the front surface flange 11 of each thereof receives a collision load in a pendulum collision test. FIGS. 7A, 7B are graphs that respectively illustrate load-stroke curves and energy absorption amount-stroke curves of the bumper reinforcements of the embodiment and the first comparative example. Here, a bumper reinforcement 210 of the first comparative example has a similar configuration to the bumper reinforcement 10 of the embodiment except for a point that an end of an upper surface web 212 on the upper lip 14 side is not thickened. Note that, in the pendulum collision test, a pendulum collides with the front surface flange of each of the bumper reinforcements, both of the ends of which are supported, at a prescribed speed, and a stroke amount, an energy absorption amount, and the like of each of the bumper reinforcements at the time are examined. The inventors of the subject application have discovered that, as a result of the pendulum collision test using the bumper reinforcements in the lip groove shapes to evaluate stress concentration thereof, the highest stress acted on the end 12B of the upper surface web 12 on the upper lip 14 side. As shown in FIG. 7A, when the bumper reinforcement 10 of the embodiment, which has the thickened end 12B of the upper surface web 12 on the upper lip 14 side, is used, an integrated value of the load-stroke curve can have a large value when compared to the bumper reinforcement 210 of the first comparative example, which does not have the thickened end of the upper surface web 212 on the upper lip 14 side. Thus, as shown in FIG. 7B, the target energy absorption amount can be achieved with the smaller stroke amount.

FIGS. 8A, 8B are views that respectively illustrate the situations of the deformation of the bumper reinforcements of the embodiment and a second comparative example in the pendulum collision test. Here, as a bumper reinforcement 310 of the second comparative example, a bumper reinforcement that has: a front surface flange 311; a back surface flange 315 that is parallel with the front surface flange 311; an upper surface web 312 that connects an upper end of the front surface flange 311 and an upper end of the back surface flange 315; a lower surface web 313 that connects a lower end of the front surface flange 311 and a lower end of the back surface flange 315; and an intermediate web 314 between the upper surface web 312 and the lower surface web 313, and that is configured to have a closed cross section is used. In the bumper reinforcement 310 of the second comparative example that is configured to have the closed cross section, when the collision load is applied to the front surface flange 311 by the pendulum, compression stress acts on the front surface flange 311, and tensile stress acts on the back surface flange 315 in the vehicle width direction. Accordingly, the front surface flange 311 is stretched, and the back surface flange 315 is shrunk in a vertical direction. Thus, the upper surface web 312 and the lower surface web 313, which are restrained by the front surface flange 311 and the back surface flange 315, are deformed in an inward closed direction on the front surface flange 311 side and are deformed in an outward opened direction on the back surface flange 315 side. Meanwhile, in the bumper reinforcement 10 of the embodiment that is configured to have an opened cross section in the lip groove shape, when the collision load is applied to the front surface flange 11 by the pendulum, the front surface flange 11 is stretched in the vertical direction, and thus the upper surface web 12 and the lower surface web 13 are deformed in the outward opened direction. This is because the extension ends of the upper surface web 12 and the lower surface web 13 on an opposite side from the front surface flange 11 are free. In addition, due to shrinkage in the vertical direction, the upper lip 14 and the lower lip 15 are respectively deformed in the inward closed directions with respect to the upper surface web 12 and the lower surface web 13. Just as described, deformation modes during the minor collision differ among the bumper reinforcement 10 with the opened cross section of the embodiment and the bumper reinforcement 310 with the closed cross section of the second comparative example. Thus, it is considered that the deformation of the bumper reinforcement 310 of the second comparative example can efficiently be suppressed by thickening the ends of the upper surface web 312 in a manner to be swelled inward and that the deformation of the bumper reinforcement 10 of the embodiment can efficiently be suppressed by thickening the end 12B of the upper surface web 12 in a manner to be swelled outward.

The bumper reinforcement 10 of the embodiment that has been described so far has the front surface flange 11, the upper surface web 12, the lower surface web 13, the upper lip 14, and the lower lip 15 and is formed in the lip groove shape in which a portion between lips is opened. In the bumper reinforcement 10, the end 12B of the upper surface web 12 on the upper lip 14 side is thicker than the center 12M. In the bumper reinforcement 10 in the lip groove shape, when the collision load is applied to the upper side of the front surface flange 11, the upper surface web 12 is deformed in the outward opened direction, and the upper lip 14 is deformed in the inward closed direction with respect to the front surface flange 11. Accordingly, when the end 12B of the upper surface web 12 on the upper lip 14 side is thicker than the center 12M, bending strength in the inward closed direction is reinforced, and the deformation of the bumper reinforcement 10 can be suppressed. As a result, in the bumper reinforcement 10 that is configured to have the opened cross section, the stroke amount during the minor collision can further be reduced.

In addition, in the bumper reinforcement 10 of the embodiment, the end 12B of the upper surface web 12 on the upper lip 14 side is thickened such that the outer surface side thereof is swelled but the inner surface side thereof is not swelled. Accordingly, the deformation of the upper lip 14 in the inward closed direction with respect to the upper surface web 12 can effectively be suppressed. In addition, the end 12B is thickened such that the inner surface side is not swelled. Accordingly, when the tip of the side member 1 is inserted in the bumper reinforcement 10, the interference between the inner surface of the end 12B and the outer surface of the side member 1 can be prevented.

Figure 9:
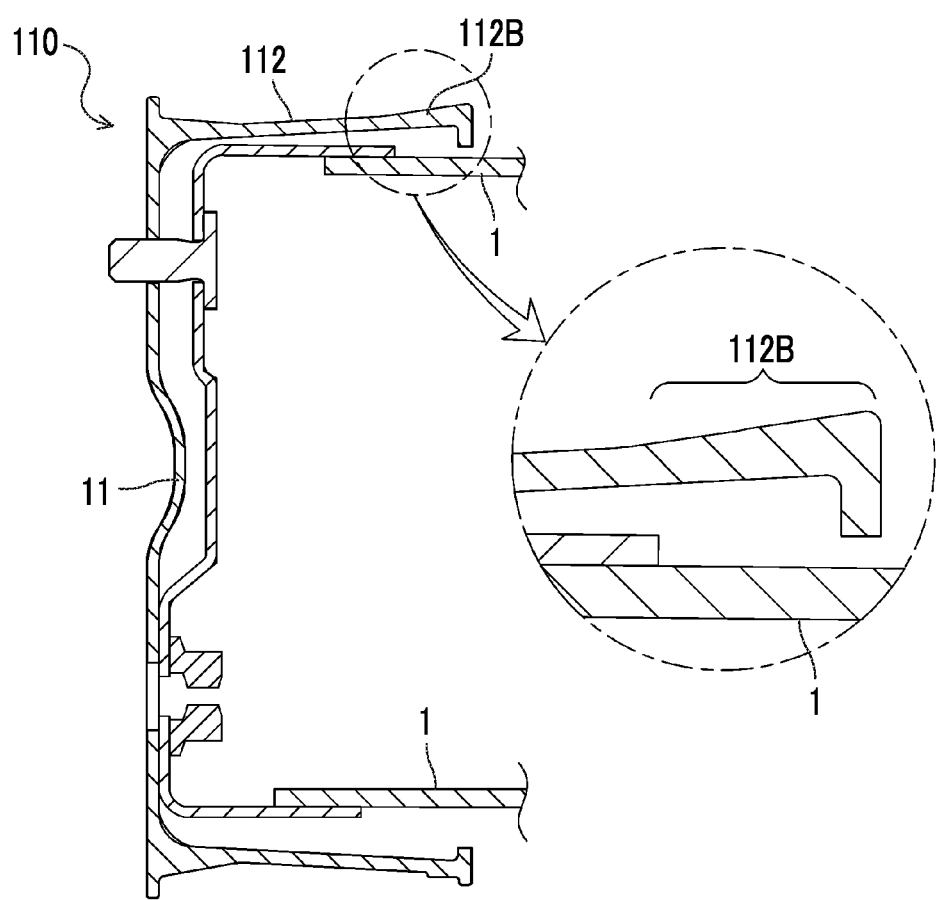
FIG. 9 is a cross-sectional view of a bumper reinforcement 110 of a modified example.

In the bumper reinforcement 10 of the embodiment, the end 12B of the upper surface web 12 on the upper lip 14 side is formed such that a top of swelling (the outer surface) has a substantially flat surface (thickness becomes substantially even thickness). However, as shown in a bumper reinforcement 110 of a modified example in FIG. 9, plate thickness of an upper surface web 112 may be changed to have a tapered shape such that the plate thickness is gradually increased toward the upper lip 14 side.

In the embodiment and the modified example thereof, the end 12B (an end 112B) of the upper surface web 12 (the upper surface web 112) on the upper lip 14 side is thickened. However, the end 13B of the lower surface web 13 on the lower lip 15 side may be thickened, or both of the end 12B of the upper surface web 12 on the upper lip 14 side and the end 13B of the lower surface web 13 on the lower lip 15 side may be thickened. Note that whether to provide a thickened section to the upper surface web 12 or the lower surface web 13 may appropriately be determined in accordance with a position at which the pendulum collides with the bumper reinforcement 10 (the front surface flange 11) in a collision test (the pendulum collision test), that is, attachment height of the bumper reinforcement 10.

In the embodiment, the bumper reinforcement 10 is fastened to the side members 1. However, the bumper reinforcement 10 may be fastened to the side members 1 via a crush box. In this case, a part or a whole of the crush box may be inserted in the bumper reinforcement 10. In addition, the bumper reinforcement 10 may be fastened to the side members 1 via a stay.

In the embodiment, aluminum or the alloy thereof is used as the material of the bumper reinforcement 10. However, lightweight metal other than aluminum, a synthetic resin material, a steel material, a stainless steel material, or the like may be used. In addition, a manufacturing method of the bumper reinforcement 10 is not limited to an extrusion molding method, and casting or the like may be used.

The mode for carrying out the disclosure has been described so far by using the embodiment. However, the disclosure is not limited to such an embodiment in any respect. Needless to say, the disclosure can be implemented in various modes within the scope that does not depart from the gist of the disclosure.

The disclosure can be used in a bumper reinforcement manufacturing industry and the like.

What is claimed is:

1. An automotive bumper reinforcement with a hollow structure that extends in a vehicle width direction, the automotive bumper reinforcement comprising:

a front surface flange;

an upper surface web that extends in a direction orthogonal to the front surface flange from an upper end of the front surface flange;

a lower surface web that extends in the direction orthogonal to the front surface flange from a lower end of the front surface flange;

an upper lip that extends downward from an extension end of the upper surface web; and a lower lip that extends upward from an extension end of the lower surface web, wherein an opening is provided between the upper lip and the lower lip, and an end of at least one of the upper surface web and the lower surface web on a lip side where the upper lip or the lower lip is provided has a thickened section that is thicker than a center thereof, wherein a coupled member that is fixed to a side member extending in a vehicle longitudinal direction is coupled to the bumper reinforcement in a state of being inserted therein and abutting an inner wall surface of the front surface flange.

2. The automotive bumper reinforcement according to claim 1, wherein the thickened section is formed in a manner to be swelled outward.

3. The automotive bumper reinforcement according to claim 2, wherein a top of swelling of the thickened section has a flat surface.

4. The automotive bumper reinforcement according to claim 1, wherein a thickness of the thickened section is gradually increased from the center to the end.

5. The automotive bumper reinforcement according to claim 1, wherein an end of at least one of the upper surface web and the lower surface web on a front surface flange side has a thickened section that is thicker than the center.

* * * * *